A. BENTON & C. D. JORDAN.
CULTIVATOR.
APPLICATION FILED JUNE 29, 1909.
935,578.
Patented Sept. 28, 1909.
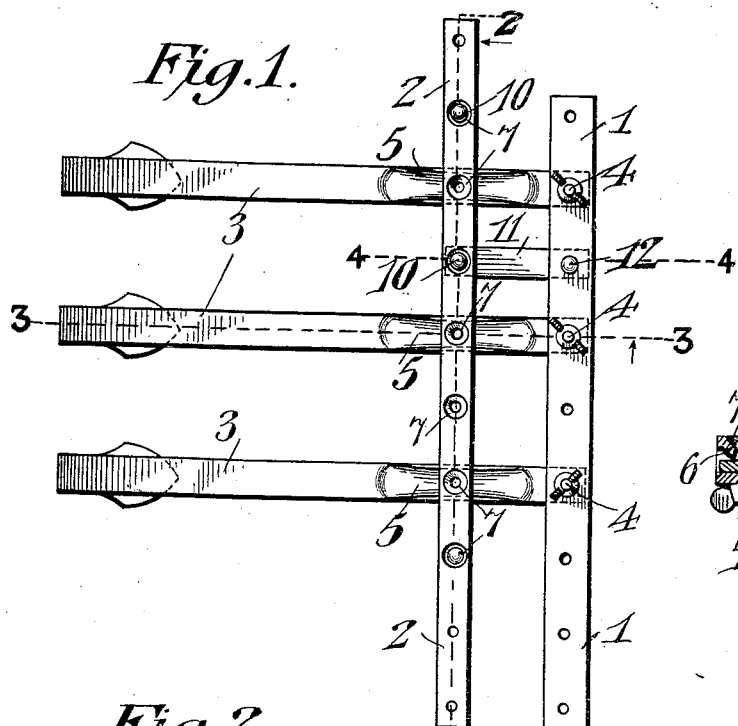
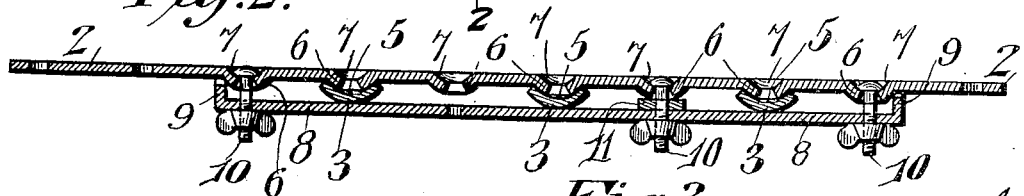
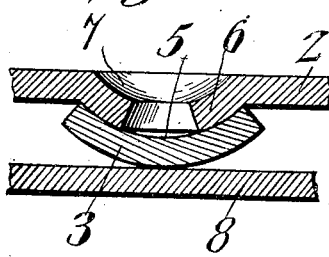
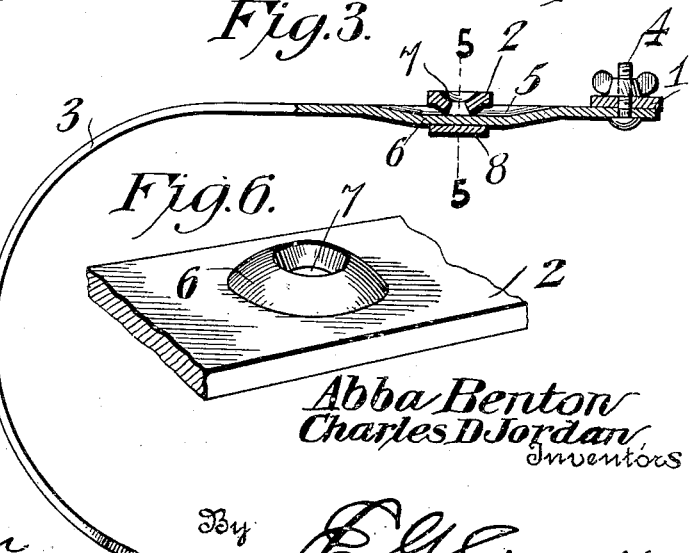
Abba Benton
Charles D Jordan,
Inventors
Witnesses

UNITED STATES PATENT OFFICE.

ABBA BENTON AND CHARLES DILLON JORDAN, OF MONTICELLO, GEORGIA.

CULTIVATOR.

935,578.   Specification of Letters Patent.   Patented Sept. 28, 1909.

Application filed June 29, 1909.   Serial No. 505,042.

*To all whom it may concern:*

Be it known that we, ABBA BENTON and CHARLES DILLON JORDAN, citizens of the United States, residing at Monticello, in the county of Jasper and State of Georgia, have invented a new and useful Cultivator, of which the following is a specification.

The invention relates to improvements in cultivators.

The object of the present invention is to improve the construction of that class of cultivators employing transverse bars, extending laterally from the beam and carrying spring teeth, and to provide an improved construction for connecting the teeth with the laterally extending bars, whereby greater strength, a more rapid assembling of the parts and an easier adjustment of the same are secured.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a plan view of a portion of a cultivator, constructed in accordance with this invention. Fig. 2 is a transverse sectional view on the line 2—2 of Fig. 1. Fig. 3 is a longitudinal sectional view on the line 3—3 of Fig. 1. Fig. 4 is a detail sectional view on the line 4—4 of Fig. 1. Fig. 5 is an enlarged detail sectional view on the line 5—5 of Fig. 3. Fig. 6 is an enlarged detail perspective view of a portion of the rear laterally extending tooth-carrying bar, illustrating the construction of the rounded protuberances.

Like numerals of reference designate corresponding parts in all the figures of the drawing.

1 and 2 designate front and rear transversely disposed tooth-carrying bars, designed to be pivotally connected with and to extend from the side of a beam (not shown) in a manner similar to the laterally extending bars of the combined cultivator, harrow and plow, shown and described in Patent No. 902,367, granted to us, Oct. 2, 1908. The spring teeth 3, which may have soil-engaging terminals of any desired construction, are connected at their front ends to the lower face of the laterally extending bar 1 by bolts 4, or other suitable fastening devices, and they are provided in their upper straight longitudinal portions with longitudinal grooves 5, which are curved in cross section and present concave upper faces to a series of rounded protuberances 6 of the rear transverse bar 2. The rounded protuberances 6 are formed by openings 7, counter-sunk in the upper face of the rear transverse bar 2, and the protuberances, which project from the lower face of the rear transverse bar 2, fit in the grooves of the upper faces of the spring teeth and coöperate with the said grooves to form pivotal connections between the rear transverse bar and the said teeth. This construction dispenses with the use of bolts for pivoting the teeth and the rear transverse bar together, and the longitudinal grooves of the spring teeth will permit an adjustment of the rear transverse bar toward and from the front transverse bar 1, thereby facilitating the assembling of the parts and obviating the necessity of providing a plurality of bolt holes. This form of pivotal connection also results in an easy adjustment of the teeth by the operator, and the fitting of the protuberances between the curved side portions of the teeth results in a bracing of the parts, and avoids the looseness resulting from the employment of bolts. Increased strength at the pivotal connections between the spring teeth and the rear transverse bar is secured, without injuring the fiber of the metal.

The spring teeth are supported in their interlocked pivotal connection with the rear transverse bar by means of a lower transverse brace 8, having upturned terminals 9, spacing the brace 8 from the lower face of the transverse bar 2. The transverse brace 8, which is of a length less than the transverse bar 2, is secured at intervals to the same by means of bolts 10, which also serve to connect the rear ends of a short longitudinal brace 11 to the rear transverse bar and its brace. The short brace 11, which extends between the bars 1 and 2, is pivoted at its front end to the bar 1 by a bolt 12, or other suitable fastening device. The assembling of the parts in the construction of cultivators, the brace 11 may be made of different lengths, and the longitudinal grooves 5 of the spring teeth will enable the rear transverse bar to be positioned different distances from the front transverse bar 1 without perforating the spring teeth at the rear transverse bar. The rear transverse bar may be provided with any number of protuberances to permit the desired number of teeth to be used and also to afford an adjustment, whereby the teeth may be arranged in different positions at different distances from the beam.

Having thus fully described our invention, what we claim as new and desire to secure by Letters Patent, is:—

1. A cultivator including front and rear transverse bars, the rear transverse bar being provided at its lower face with a protuberance, and a spring tooth pivotally connected to the front bar and provided in rear of the same with a longitudinal groove receiving the protuberance of the rear transverse bar and coöperating with the same to form a pivotal connection and adapted to permit an adjustment of the rear transverse bar toward and from the front transverse bar in the construction of the cultivator.

2. A cultivator including front and rear transverse bars, the rear transverse bar being provided at intervals with openings countersunk in the upper face of the transverse bar and forming protuberances at the lower face of the same, a plurality of spring teeth pivotally connected with the front transverse bar and provided in their upper faces with longitudinal grooves receiving the protuberances of the rear transverse bar, and a brace located beneath the rear transverse bar and secured to the same and supporting the teeth in their interlocked pivotal connection with the rear transverse bar.

3. A cultivator including front and rear transverse bars, the rear transverse bar being provided at intervals with openings countersunk in the upper face of the transverse bar and forming protuberances at the lower face of the same, a plurality of spring teeth pivotally connected with the front transverse bar and provided in their upper faces with longitudinal grooves receiving the protuberances of the rear transverse bar, a transverse brace located beneath the rear transverse bar and connecting upturned terminals fitted against the same, said transverse brace supporting the teeth in engagement with the protuberance of the rear transverse bar, and a supporting longitudinal brace extending between the front and rear transverse bars and secured to the same, the fastening means at the rear end of the brace passing through the adjacent counter-sunk opening of the rear transverse bar.

In testimony that we claim the foregoing as our own, we have hereto affixed our signatures in the presence of two witnesses.

ABBA BENTON.
CHARLES DILLON JORDAN.

Witnesses:
J. J. Pope,
M. B. Perry.